United States Patent
Rojey et al.

(10) Patent No.: US 6,442,969 B1
(45) Date of Patent: Sep. 3, 2002

(54) PROCESS AND DEVICE FOR SEPARATION OF AT LEAST ONE ACID GAS THAT IS CONTAINED IN A GAS MIXTURE

(75) Inventors: Alexandre Rojey, Rueil Malmaison; Béatrice Fischer, Lyons; Ari Minkkinen, Saint Nom la Breteche, all of (FR)

(73) Assignee: Institut Francais du Petrole (FR)

( * ) Notice: Subject to any disclaimer, the term of this patent is extended or adjusted under 35 U.S.C. 154(b) by 0 days.

(21) Appl. No.: 09/846,784

(22) Filed: May 2, 2001

(30) Foreign Application Priority Data

May 2, 2000 (FR) .............................................. 00 05678

(51) Int. Cl.⁷ ................................................. F25J 3/00
(52) U.S. Cl. .............................. 62/618; 62/620; 62/929
(58) Field of Search .......................... 62/618–620, 630, 62/929–930

(56) References Cited

U.S. PATENT DOCUMENTS

| | | | | |
|---|---|---|---|---|
| 2,122,238 A | * | 6/1938 | Pollitzer ...................... | 62/619 |
| 2,760,352 A | * | 8/1956 | Hachmuth .................... | 62/620 |
| 3,568,458 A | * | 3/1971 | Hoffman ...................... | 62/620 |
| 4,152,129 A | * | 5/1979 | Trentham et al. ............. | 62/929 |
| 4,747,858 A | * | 5/1988 | Gottier ........................ | 62/929 |
| 4,762,543 A | * | 8/1988 | Pantermuehl et al. ......... | 62/929 |
| 4,990,168 A | * | 2/1991 | Sauer et al. .................. | 62/929 |
| 5,461,870 A | * | 10/1995 | Paradowski .................. | 62/620 |
| 5,927,103 A | | 7/1999 | Howard ....................... | 62/620 |
| 5,983,663 A | | 11/1999 | Sterner ........................ | 62/620 |

* cited by examiner

Primary Examiner—William C. Coerrler
(74) Attorney, Agent, or Firm—Millen, White, Zelano & Branigan, P.C.

(57) ABSTRACT

For the separation of acid, carbon dioxide and/or hydrogen sulfide from a gaseous mixture comprising at least one lighter gas, e.g. methane, the gaseous mixture (1) is precooled at least once during a heat exchange operation E2; the resultant precooled gas mixture, flowing upwardly is cooled and rectified simultaneously in an approximately vertical heat exchange zone (ER) forming a downwardly-flowing countercurrent liquid reflux; the resultant rectified gaseous fraction (8) depleted in acid gases and enriched in light gas is collected at the top of the vertical exchange zone; and (d) a liquid fraction (4) enriched in acid gas components is collected at the bottom of the exchange zone. The collected liquid fraction (4) can be expanded and evaporated to provide cooling. The system has particular application for the treatment of natural gas or in petroleum refining or recovery operations.

14 Claims, 4 Drawing Sheets

PROCESS AND DEVICE FOR SEPARATION OF AT LEAST ONE ACID GAS THAT IS CONTAINED IN A GAS MIXTURE

The invention relates to a process and a device for separation of an acid gas fraction comprising carbon dioxide and/or hydrogen sulfide contained in a gas mixture, e.g. a sour gas, that comprises at least one lighter component, such as methane.

The technological background is illustrated by U.S. Pat. Nos. 4,152,129, 5,983,663 and 5,927,103.

The separation of carbon dioxide that is contained in a gas mixture is an operation that is intended either to obtain a gas that contains a reduced content of carbon dioxide, for example in the case of a natural gas, with a view to obtaining an adequate gross calorific value or to obtaining a carbon dioxide-concentrated gas. Such a gas can be used, for example, to carry out an assisted recovery operation of petroleum. In addition, the wish to limit carbon dioxide emissions into the atmosphere leads to a growing advantage for operations for reinjecting carbon dioxide underground. In this case, it is generally preferable to inject underground a carbon dioxide-concentrated gas either to avoid losing enrichable fractions or to reduce the cost of the compression and injection operation.

There exist different processes for treatment of a gas such as a natural gas or a refinery gas to separate the carbon dioxide. These processes are generally based on an operation of absorption by a chemical or physical solvent. These processes are limited, however, to the treatment of a gas containing relatively small contents of carbon dioxide, for example not exceeding 20 mol %.

In the case of a gas mixture that contains high carbon dioxide contents, there exist very few suitable solutions.

The Ryan-Holmes process, which is most used in this case and which is based on a series of stages of fractionation by distillation, is a costly process. This process that operates under cold conditions typically uses four distillation columns, operating in the presence of an additive, and consists of a hydrocarbon fraction that is recycled so as to avoid any risk of crystallization of the carbon dioxide.

In the same way, it may be necessary to separate from a gas mixture, such as a natural gas, another acid gas such as hydrogen sulfide ($H_2S$). There exist processes that make it possible to separate such a contaminant that is toxic and corrosive, for example by washing the gas mixture with an amine. These processes become very costly, however, as soon as the gas mixture comprises more than 10 to 15% of $H_2S$.

The process according to the invention aims at separating an acid gas such as $CO_2$ and/or $H_2S$ in a more economical manner by reducing the amount of equipment needed as well as the energy consumption.

It was discovered, and this is a first object of this invention, that it is possible to carry out such an operation in a simple and economical manner by operating the refrigeration and the rectification of the gas mixture simultaneously in an indirect heat exchanger.

More specifically, the invention relates to a process for separation of an acid gas fraction that comprises carbon dioxide and/or hydrogen sulfide that is contained in a mixture that comprises at least one lighter gas, characterized in that it comprises the following stages:

(a) gas mixture (1) is precooled at least once during a heat exchange operation (E2),
(b) the gas mixture that is obtained from stage (a) is cooled and rectified simultaneously in an approximately vertical heat exchange zone (ER) by generating a downward liquid reflux,
(c) a gaseous fraction (8) that is low in acid gases and high in light gas is collected at the top of the vertical exchange zone, and
(d) an acid gas-enriched liquid fraction (4) is collected at the bottom of the exchange zone.

Such a cooling and rectification exchanger is, for example, a plate exchanger. The gas mixture that is to be separated circulates vertically in the upward direction in the exchanger while being cooled. The circulation speed of the gas mixture is kept at a low enough value for the liquid fraction that is generated by cooling to be able to descend again in countercurrent to the gas mixture. In going down, this liquid fraction is reheated and enriched with carbon dioxide while the gas mixture exits at the top with a substantially reduced carbon dioxide content.

By extracting heat by indirect exchange, more reflux is created and thus a better acid gas ($CO_2$ for example) /light gas (hydrocarbon for example) fractionation is obtained.

The gaseous fraction that is low in acid gases, collected during stage (c), can comprise methane and/or nitrogen and/or hydrogen.

According to a first variant of the invention, it was also discovered that the refrigeration that is necessary to the gas mixture can be ensured at least in part by being expanded at least once and by evaporating in the exchanger at least in part the acid gas-rich liquid fraction collected at the base of the exchanger in which the fractionation of the mixture is carried out.

According to a characteristic of this invention, the expanded liquid fraction is separated in a separation chamber B2, and an acid gas-rich gaseous top fraction that is recycled in stage (a) is recovered. It is preferable to carry out at least in part a first expansion of the liquid fraction and to separate a first expansion effluent in a first separation chamber in such a way as to recover at the top a first gaseous fraction that is enriched with lighter components than the acid gases recycled in stage (a) and a first acid gas-enriched liquid fraction. This first liquid fraction can be expanded at least in part, and the second expansion effluent can be separated into a second gaseous top fraction that is enriched with lighter components than the acid gases, recycled in precooling stage (a), and into a second acid gas-enriched liquid fraction that is used as a coolant in the heat exchanger. These first and second gaseous fractions that are enriched with lighter components than the acid gases and at two different pressure levels can be recompressed. The fact of operating in at least two stages makes it possible to reduce the mechanical energy of compression that is necessary for recycling the separated gaseous fractions in stage (a).

According to another embodiment, the acid gas-enriched liquid fraction that is collected at the end of stage (d) can be expanded successively to at least two pressure levels, whereby liquid fraction (4a) that is obtained at the end of a first expansion stage is brought into contact in a zone (C1) for countercurrent contact with a vapor reflux (16) that is obtained from the evaporation of a portion of liquid fraction (5a) that is collected at the bottom of said contact zone (C1).

According to a second variant of the invention, the refrigeration that is required during stage (b) can be ensured at least in part by expansion (TD) of gaseous fraction (8) that is low in acid gas and high in light gas that is collected during stage (c).

According to a third variant of the invention, the refrigeration that is required during stage (b) can be ensured at least in part by external refrigeration means, for example an external refrigeration cycle that operates with propane.

According to another characteristic of the process, it is also possible to operate the contact in countercurrent that is carried out in exchanger ER between the acid gas-rich gaseous fraction and the liquid reflux in the presence of solvent.

This offers various advantages. First of all, it thus is possible to inhibit the formation of solid crystals of carbon dioxide and thus to be able to drop to a lower temperature, for example −50° C., at the top of exchanger ER. By operating at a lower temperature, the amount of acid gas(es) entrained with the lighter gas, for example methane and/or nitrogen with which this or these acid gas(es) are mixed, is reduced.

The addition of a solvent may also make it possible to improve the quality of the separation, primarily if this solvent has a selective nature compared to the acid gas(es) to be separated.

This solvent is preferably a polar solvent with a low enough viscosity to be able to be used at relatively low temperature, such as, for example, methanol, dimethyltetraethylene glycol or propylene carbonate, pure or mixed. Any physical solvent that can be used to carry out a deacidification operation can be considered.

It is also possible to use a light hydrocarbon, if such a hydrocarbon is produced on site, to keep any solvent from being fed in.

The presence of solvent also makes it possible to improve the separation between the $CO_2$ and/or the $H_2S$ and the hydrocarbons by preventing azeotrope formation, in particular between $C0_2$ and ethane, as well as between $H_2S$ and ethane or propane. The amount of solvent can vary in large proportions according to the application and the degree of separation desired, and the molar ratio of the amount of solvent to the amount of extracted acid gases can be between, for example, 0.5 and 10.

Under these conditions, an optionally cooled liquid stream that comprises the solvent can be sent to the top of the exchange zone in which stage (b) is carried out by collecting, at the bottom of said exchange zone (ER), acid gas-enriched liquid fraction (4) and at least a portion of the solvent that is sent to the top.

The acid gas-enriched liquid fraction, collected at the bottom of exchange zone ER, can be at least partially expanded, separated and reheated in exchange zone (E2) in which the operation of stage (a) is carried out by generating an acid gas-enriched gaseous fraction (23) and a liquid fraction (20) that is recycled in stage (b).

The operating conditions of the process are generally as follows:

precooling stage (a), up to a temperature that is close to the dew point temperature of the gas, between, for example, +10° C. and −20° C., stage (b) for ensuring indirect contact in the heat exchanger.

Pressure: 10 to 70 bar and preferably 30 to 60 bar (1 bar=$10^5$ Pa) Temperature:
−10 to −50° C. without solvent
−10 to −80° C. with solvent Generally, the temperatures that are used to separate a $CO_2$-rich acid gas are lower than those for separating an $H_2S$-rich acid gas. The gas that is thus treated can thus be a natural gas or an industrial gas such as a synthesis gas or a refinery gas, whereby it can contain at least one acid gas.

The process applies to various compositions of the mixture of acid gases to be separated.

The acid gases to be separated can comprise carbon dioxide and/or hydrogen sulfide separately or mixed. They can also comprise other acid contaminants, such as mercaptans, COS, or $CS_2$.

The lightest gases from which they are separated can comprise methane and/or nitrogen separately or mixed. They can also comprise other light gases such as hydrogen, as well as hydrocarbons such as ethane, propane or even heavier hydrocarbons, some of which can be recovered with the acid gases at the end of the separation that is carried out by the process.

The process preferably can apply for a $CO_2$ content that is at least equal to 20 mol % or for an $H_2S$ content that is at least equal to 10 mol %.

Each of the fractions that are separated by the process can undergo additional treatments according to various methods of one skilled in the art.

The acid gas fraction that is obtained can be fractionated, for example by distillation, to separate each of the acid gases that it contains as well as the hydrocarbons that can be found with this fraction.

The at least partially deacidified gaseous fraction can undergo an additional treatment, for example by washing by solvent.

The countercurrent contact between the upward gaseous fraction and the downward liquid fraction that is carried out in the exchanger denoted ER in the diagrams of FIGS. 1 to 4 can be operated at pressures of between, for example, 10 and 70 bar.

The temperature at the top of this exchanger can drop to about −50° C. in the absence of solvent and to about −80° C. in the presence of solvent.

The necessary refrigeration can be ensured by evaporation of a liquid fraction that comprises acid gases that are separated by the process. It can also be ensured by expansion of the gaseous fraction that is low in acid gases or by other means that are known to one skilled in the art such as, for example, an external refrigeration cycle that operates with propane.

At least a portion of the acid fraction can be pumped to be reinjected under pressure via at least one injection well underground (a reservoir, for example) with a view to carrying out an assisted recovery of petroleum.

In the presence of solvent, it is also possible to fractionate a gas mixture that contains water. In this case, the solvent is to be at least partially water-miscible to prevent the formation of ice or hydrate crystals. This solvent can be, for example, methanol. In this case, the water is recovered with the solvent and can be separated from methanol, for example by bringing this solvent phase into contact with at least one fraction of the feedstock gas.

The invention also relates to a device for separating an acid gas fraction that is contained in a mixture that comprises at least one lighter gas, characterized in that it comprises:

at least one indirect cooling means (E2) of the mixture that has a first inlet connected to a mixture feed (1) and an outlet;

an indirect heat exchanger ER that is approximately vertical and that comprises at its base a separating tank B1 that is connected to the outlet of cooling means E2, whereby said exchanger comprises means (MF) for circulating a coolant and means (MC) for circulating a hot fluid that is connected to separating tank B1;

means (8) for recovery at the top of heat exchanger ER of a gaseous fluid that has been cooled, high in light gas and low in acid gases, connected to a second inlet of indirect cooling means E2;

means (4) for recovery of a liquid fluid that is high in acid gases and low in light gases at the bottom of separating tank B1.

Means (4) for recovery of the acid gas-enriched fluid can comprise at least one fluid expansion means V1 connected to means for circulating the coolant in heat exchanger ER, whereby said circulation means of the evaporated coolant are connected to a third inlet of indirect cooling means E2 to deliver an acid gasenriched gas.

According to a first variant of the device, the expansion means can be coupled to a first separating tank B2 that comprises an upper outlet for a gas that contains acid gases connected to a fourth inlet of indirect cooling means, and a lower outlet for an acid gas-enriched liquid, whereby said lower outlet comprises a second expansion means V3 coupled to a second separating tank B3 that comprises an upper outlet for a gas that contains acid gases connected to a fifth inlet of the indirect cooling means, whereby said indirect cooling means has a fourth outlet and a fifth outlet for gas that contains acid gases corresponding to the fourth and fifth inlets connected to gas mixture feed (1) via a compressor (K1); whereby said second separating tank (B3) has a lower outlet connected to means for circulating the coolant in exchanger ER.

According to a second variant, the means for recovery of acid gas-enriched fluid comprise expansion means V2 coupled to a column C1 that comprises packing elements, whereby the column has an upper outlet for a gas that contains acid gas connected to the gas mixture feed via indirect cooling means E2 and a compressor K1, and a lower outlet 5a for an acid gas-concentrated liquid, whereby a second expansion means V3 is connected to the lower outlet for the liquid and to means (MF) for circulating the coolant in the upper part of exchanger ER at a temperature T2, whereby said exchanger comprises in its lower part another means (15, 16) for circulating coolant at a temperature T1>T2, connected to lower outlet (5a) of the liquid and to the lower part of said column C1.

According to a third variant, the means for recovery of light gas-enriched gaseous fluid comprise an expansion turbine TD of gaseous fluid connected to means (MF) for circulating coolant in exchanger ER, whereby said refrigeration means are connected to the second inlet of cooling means E2, said means (8) for circulating light gas-enriched hot fluid, for example hydrocarbons that comprise an inlet for a solvent (20) into exchanger ER, means for recovery of acid gas-enriched liquid fluid comprising an expansion means V2 coupled to a contact column (C1), whereby said column has an upper outlet for acid gas-enriched gas that passes through cooling means E2 of the mixture, and a lower outlet (21) for acid gas- and solvent-enriched liquid connected to cooling means (E2) then to a separating tank B2, whereby said separating tank has an upper outlet for acid gas connected to the lower part of contact column C1, and a lower outlet for liquid containing the solvent connected to the top of the exchanger with means (MC) for circulating hot fluid via a pump P1.

BRIEF DESCRIPTION OF THE DRAWINGS

The invention will be better understood based on the following figures illustrating several embodiments, among which.

DETAILED DESCRIPTION OF THE DRAWINGS

Figure 1:
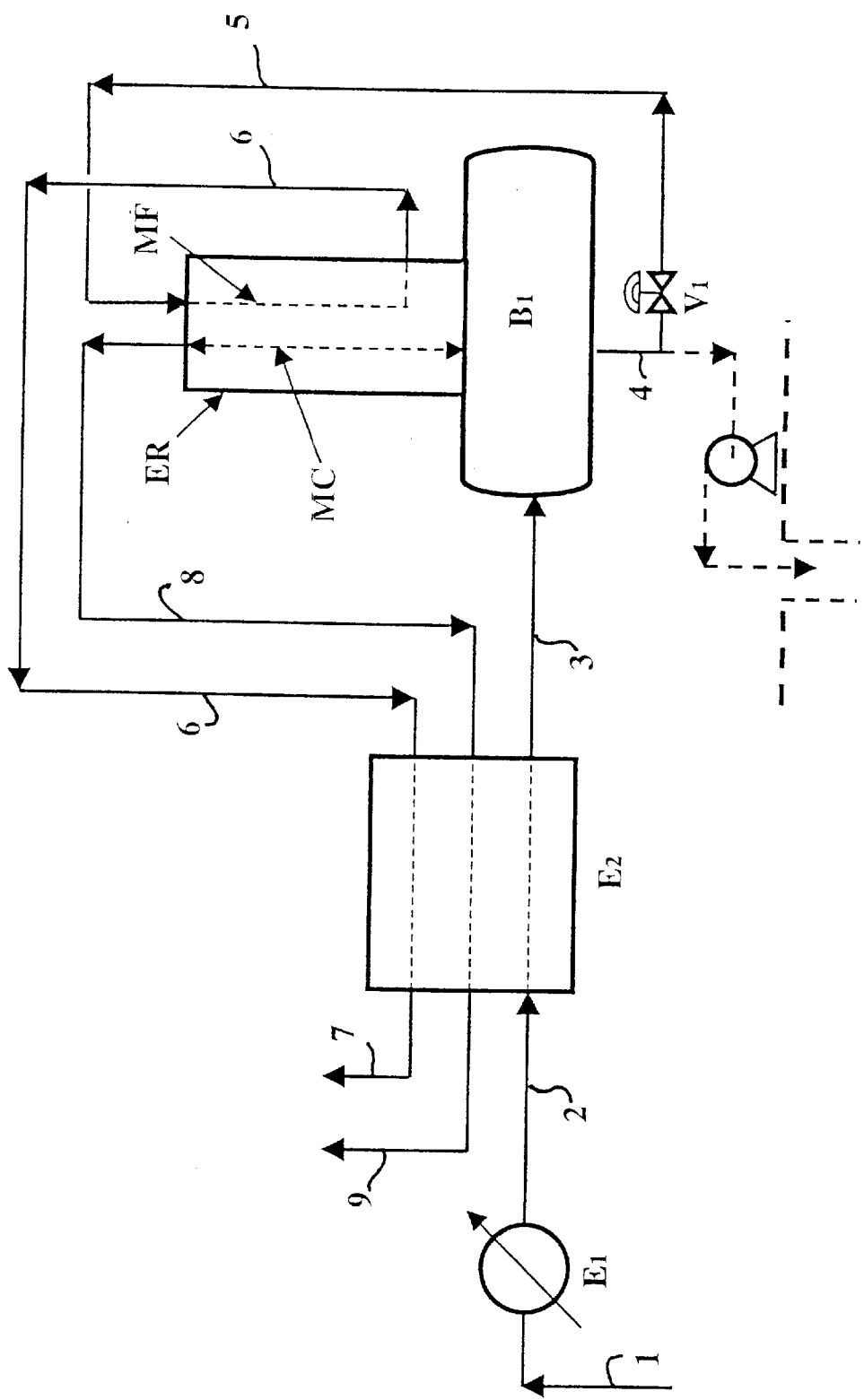
FIG. 1 shows an embodiment of the device that comprises means for precooling the feedstock by the effluents, indirect heat exchange means for separating the acid gases with a coolant that is the acid gas-enriched liquid after expansion.

The principle of the process according to the invention can be illustrated by following the layout diagram presented in FIG. 1. The gas mixture that contains methane, for example, arrives via a pipe 1 under a pressure of, advantageously, between, for example, 30 and 50 bar. It is first cooled with the ambient cooling medium, air or water that is available in exchanger E1 from where it exits via a pipe 2. It is then sent into an exchanger E2 in which it undergoes an additional cooling. It exits from there via a pipe 3 at a temperature of preferably close to its dew point. It is then sent into a separating tank B1 that is located at the base of a fractionation exchanger ER. In exchanger ER, it circulates in an upward vertical movement while being simultaneously refrigerated. The liquid fractions that are successively formed by refrigeration descend in countercurrent with respect to the gas mixture. The gas mixture thus gradually becomes depleted of acid gas, while a liquid mixture is enriched in acid gas by descending in countercurrent. An acid gas-enriched liquid fraction is thus collected in separating tank B1. This liquid fraction is removed via a pipe 4, expanded via a pressure-reducing valve V1 and sent via a pipe 5 into exchanger ER, in which it is evaporated to ensure the refrigeration of the gas mixture that is to be fractionated. It exits from exchanger ER via a pipe 6. It is then sent into exchanger E2 from where it exits via a pipe 7.

The gas mixture that contains the methane that is low in acid gas exits at the top of exchanger ER via a pipe 8. It is then sent into exchanger E2 from where it exits via a pipe 9. It can then be recompressed and/or undergo an additional treatment before being exported.

The acid gas-enriched gas mixture that exits from exchanger E2 via pipe 7 can also undergo an additional treatment and be recompressed before being injected, for example, underground with a view to carrying out an assisted recovery operation.

Figure 2:
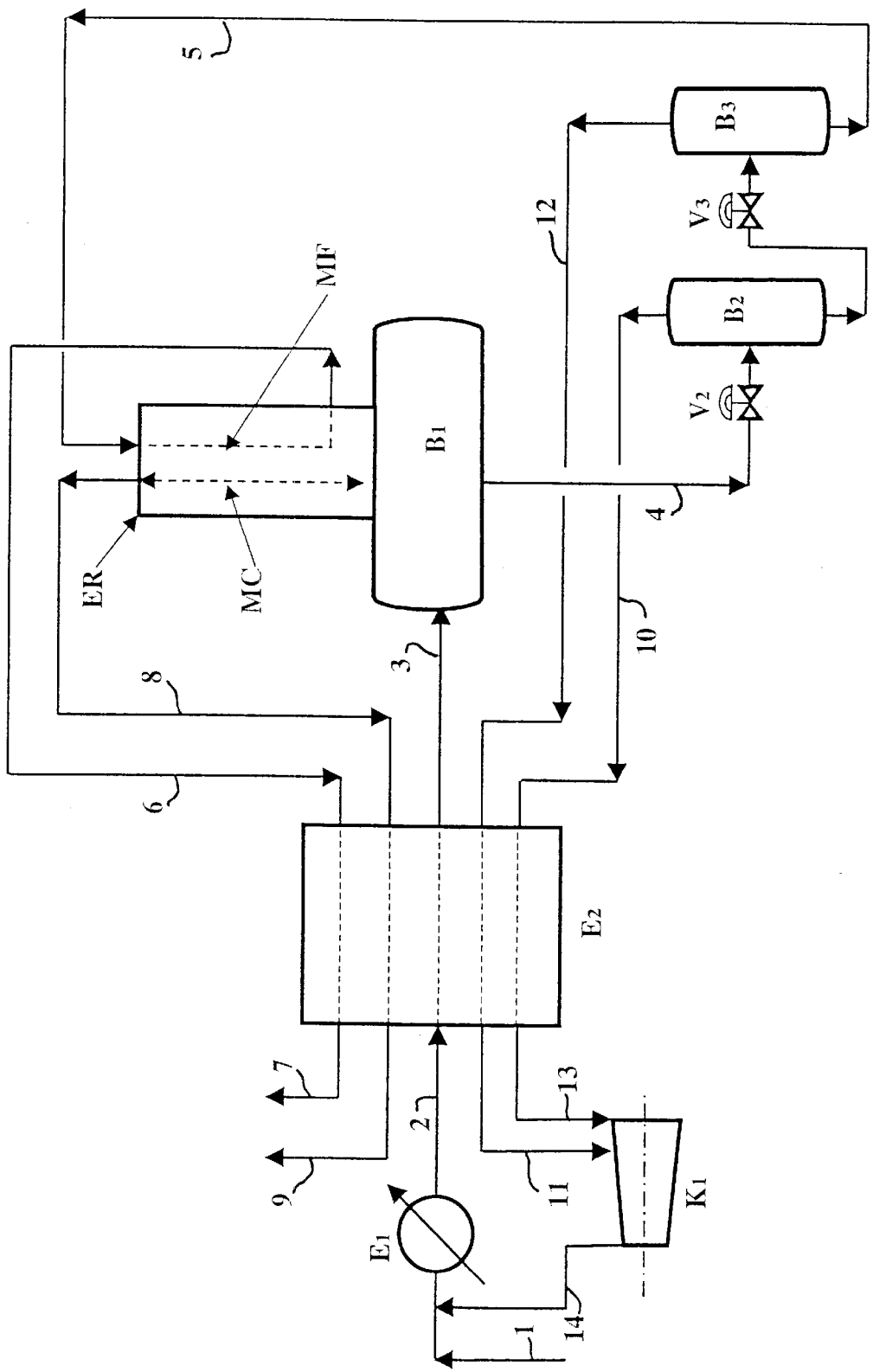
FIG. 2 shows an embodiment of the device with, in series, an expansion stage of the liquid that is obtained, enriched with acid gases, combined with a separation of a gas and a liquid used as a coolant.
Figure 3:
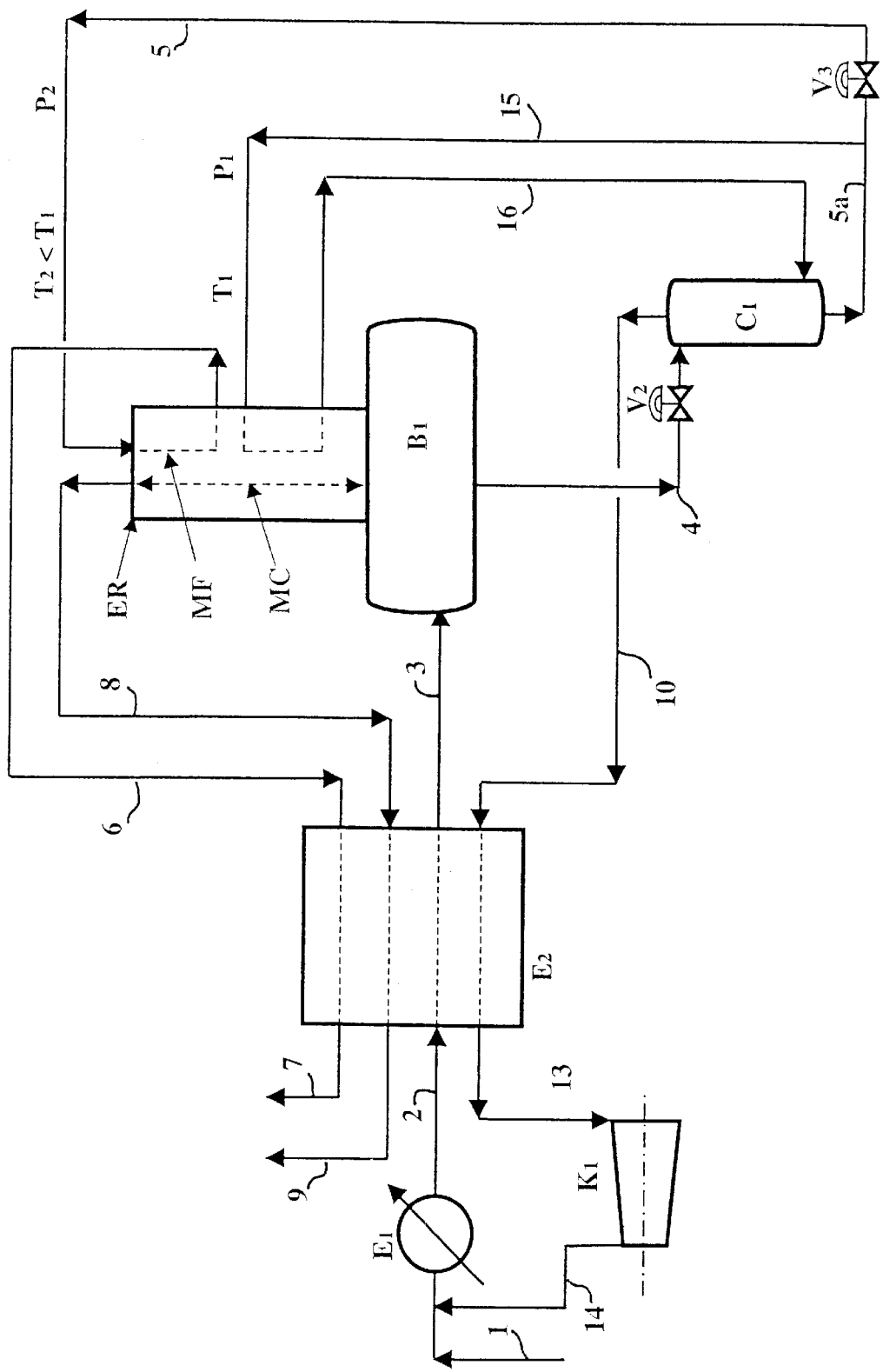
FIG. 3 illustrates a separation of the gas mixture at two pressure levels of the acid gas-enriched liquid used as a coolant.
Figure 4:
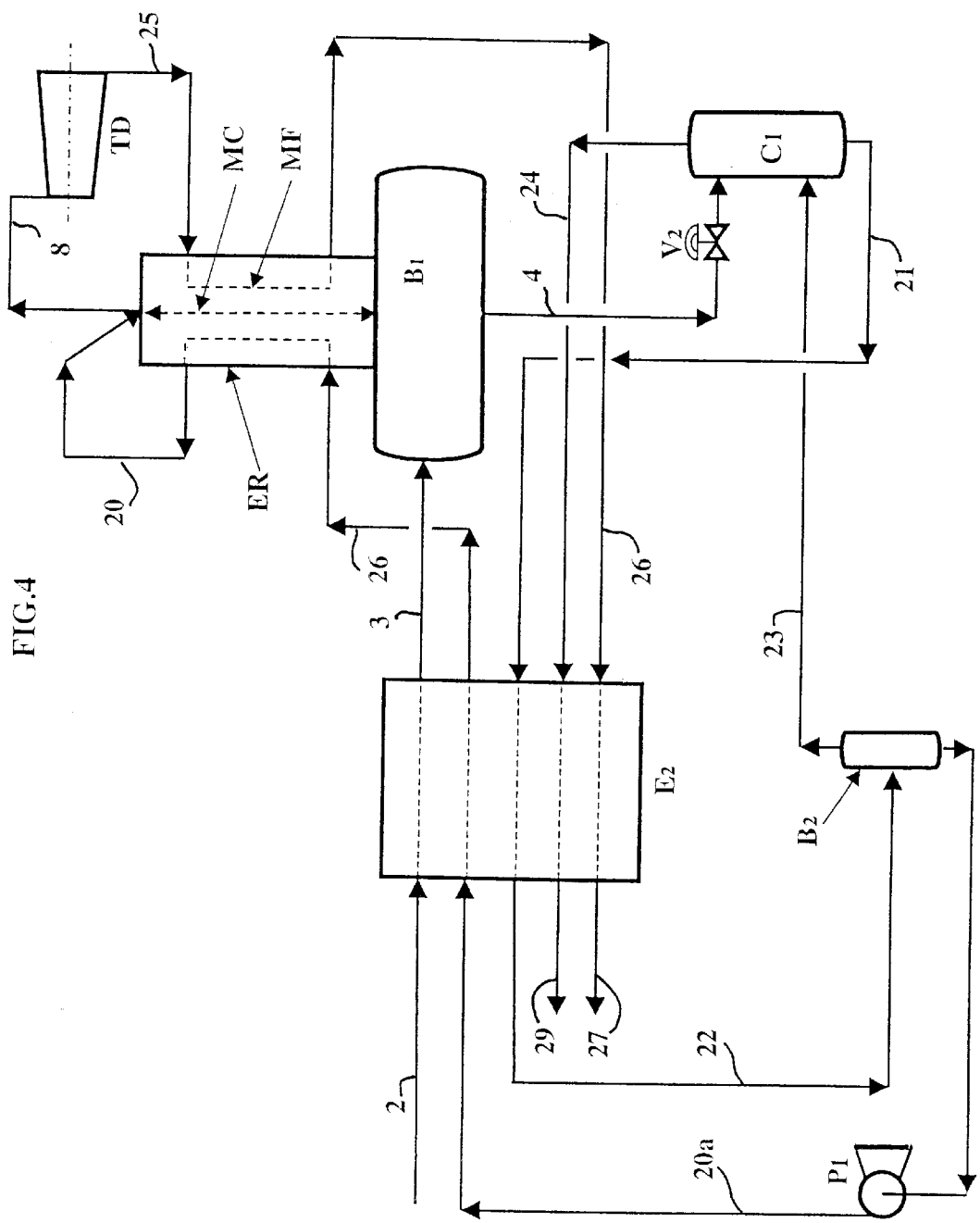
FIG. 4 shows a cooling system of the mixture comprising a solvent for expansion of the gas that is low in acid gas and high in hydrocarbons.

FIGS. 2, 3 and 4 illustrate a certain number of improvements that can be considered to carry out a more intense fractionation and/or to carry it out in a higher-performing manner.

To obtain a more pure acid gas liquid fraction, it is possible in particular to take advantage of expansion stages in order to separate gaseous fractions that entrain at least in part the residual components that are lighter than the acid gas, such as, for example, methane or nitrogen. Such an arrangement is shown in FIG. 2.

The acid gas-enriched liquid fraction that exits from separating tank B1 via pipe 4 is expanded up to a first pressure level via a pressure-reducing valve V2. A first gaseous fraction that is enriched with lighter components than the acid gas is separated by decanting in a separating tank B2 and sent via a pipe 10 into exchanger E2, from where it exits via a pipe 13. An acid gas-enriched liquid fraction that is collected in separating tank B2 is expanded up to a second pressure level via a pressure-reducing valve V3. A second gaseous fraction that is enriched with lighter components than the acid gas is separated by decanting in a separating tank B3 and is sent via a pipe 12 into exchanger E2, from where it exits via a pipe 11.

The two light component-enriched fractions are recompressed in a compressor K1 that comprises at least two successive stages that are recycled via a pipe 14 at the inlet of feedstock 1 in heat exchanger E1.

If the fraction that is enriched with carbon dioxide and/or hydrogen sulfide is to be recompressed after evaporation, for example to be injected underground, it is possible to reduce the recompression power by evaporating it in at least two successive levels of pressure to obtain graduated cooling temperatures.

It is also possible to purify said carbon dioxide-enriched fraction by bringing into contact in countercurrent, for example in a column section with packing, the acid gas-enriched liquid fraction that is obtained from separating tank B1 with a vapor fraction that is obtained from the refrigeration stage in exchanger E1 that acts as a vapor reflux. Such an arrangement is shown in FIG. 3.

The liquid fraction that is enriched with carbon dioxide and/or hydrogen sulfide that exits separating tank B1 via pipe 4 is expanded to a first pressure level via pressure reducing valve V2. It is then brought into contact in countercurrent with a vapor fraction that arrives via a pipe 16 in the lower part of a column element C1. The liquid fraction that is removed at the base of column C1 is concentrated with acid gas. A first fraction is sent via pipes 5a and 15 into exchanger ER, in which it is evaporated to ensure the refrigeration of the mixture that is to be fractionated in exchanger ER at a first cooling temperature level. The vapor fraction that exits from exchanger ER via pipe 16 is recycled with column element C1. A second fraction is expanded via a pressure reducing valve V3 up to a second pressure level and then is sent via pipe 5 into exchanger ER, in which it is evaporated to ensure the refrigeration of the mixture that is to be fractionated in exchanger ER at a second cooling temperature level that is less than the first. The vapor fraction that exits from exchanger ER via pipe 6 is sent into exchanger E2.

The vapor fraction that exits at the top of column element C1, which is enriched with (a) component(s) lighter than the acid gas, is sent via a pipe 10 into exchanger E2. At the outlet of exchanger E2, it is recompressed with compressor K1 via line 13 and recycled via line 14 to the inlet of the feedstock into exchanger E1.

According to FIG. 4, at the top of exchanger ER, a solvent that comprises, for example, methanol, is sent via a pipe 20. In tank B1 that is located at the base of exchanger ER, a liquid phase that comprises solvent and the acid gas that is separated is recovered under these conditions.

This liquid fraction is expanded via pressure reducing valve V2 and sent to contact column element C1. The liquid fraction that is collected at the base of column C1 is then sent via a pipe 21 to exchanger E2. At the outlet of exchanger E2, a liquid-vapor mixture (22) that is separated in a separating tank B2 is removed. The liquid fraction, enriched with solvent that is thus separated, is sent via pump P1 and a line 20a into exchanger E2, then into exchanger ER, in which it is first cooled then sent via pipe 20 to the top of exchanger ER to be brought into contact with the gaseous fraction that rises in exchanger ER. The gaseous fraction that is removed from separating tank B2 via a pipe 23 is sent to the base of contact column C1. At the top of contact column C1, an acid gas-enriched gaseous fraction is removed via pipe 24. The gaseous fraction that is enriched with lighter gas than the acid gas(es) to be separated, comprising, for example, methane and/or nitrogen, is removed via pipe 8, then expanded and cooled in an expansion turbine TD.

The gaseous fraction that exits from expansion turbine TD via a pipe 25 is sent into exchanger ER, which makes it possible to ensure the refrigeration that is necessary in exchanger ER, then is sent via a pipe 26 into exchanger E2, from which it exits via a pipe 27 and constitutes the gaseous fraction that is enriched with lighter gas than the acid gas(es) to be separated, comprising, for example, methane and/or nitrogen, produced by the process.

The gaseous fraction that is removed from column C1 via a pipe 24 is also sent into exchanger E2, from which it exits via a pipe 29 and constitutes the acid gas-enriched gaseous fraction that is produced by the process.

EXAMPLE

This example is illustrated in connection with the diagram of FIG. 2. The feedstock that enters via pipe 1 is formed by a flow rate of 15,000 kmol/h of a mixture that comprises (in molar fractions) 75% of $CO_2$, 24% of methane and 1% of ethane. This mixture is found at the outlet of exchanger E1 at a pressure of 50 bar and at a temperature of 50° C. It is precooled in exchanger E2, from where it exits via pipe 3 at a temperature of 2° C. The gas mixture circulates in exchanger ER in countercurrent with respect to the liquid reflux, which is generated by refrigeration and exits at the top of exchanger ER via pipe 8 at the temperature of −32.6° C. Via pipe 8, a flow rate of 5,500 kmol/h of mixture that comprises (in molar fractions) 63.5% of methane, 1.5% of ethane and 35% of $CO_2$ is thus recovered. The liquid fraction that is collected in tank B1 is first expanded to the pressure of 33 bar via pressure reducing valve V2, whereby the temperature that is obtained in separating tank B2 is −15° C., then to the pressure of 15.5 bar via pressure-reducing valve V3, whereby the temperature that is obtained in separating tank B3 is −35° C. The liquid fraction that is removed from separating tank B3 via pipe 5 is evaporated in exchanger ER in such a way as to ensure the refrigeration that is required and the vapor fraction that is thus obtained is removed via pipe 6. Via pipe 6, a flow of 9,500 kmol/h of $CO_2$ with a purity of 97.8 mol % is removed.

By lowering the temperature at the top of exchanger ER, it is possible to reduce the $CO_2$ content in the gas that is removed via pipe 8. Thus, for example, by dropping to a temperature of −60° C. at the top of exchanger ER in the presence of methanol in a molar ratio of solvent to acid gas of 1, it is possible to reduce the $CO_2$ content to a molar fraction that is less than 10%.

Exchanger ER is preferably a plate exchanger that can consist of, for example, a soldered-aluminum plate exchanger. Such an exchanger makes it possible to carry out a countercurrent heat exchange, and fluids other than those represented in the embodiments can participate in the exchange without modifying the principle of the process according to the invention. In this exchanger, the width of the channels that are arranged to ensure countercurrent circulation between the gas that rises by being cooled and the liquid reflux is selected in such a way as to obtain a rate of flow that is compatible with a countercurrent circulation of the liquid reflux.

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

The entire disclosure of all applications, patents and publications, cited above and below, and of corresponding French application 00/05.678, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for separating a fraction of acid gases comprising at least one of carbon dioxide and hydrogen sulfide from a gaseous mixture comprising at least one gas lighter than said acid gases, said process comprising the following stages:

(a) precooling said gaseous mixture (1) at least once;

(b) passing resultant precooled gaseous mixture obtained from stage (a) upwardly into an approximately vertical heat exchange zone (ER) wherein said gaseous mixture is indirectly heat exchanged to provide a downward liquid reflux, thereby contacting and rectifying the upwardly moving precooled gaseous mixture;

(c) collecting at the top of the vertical exchange zone, a gaseous fraction (8) depleted in acid gases and enriched in light gas; and (d) collecting at the bottom of the exchange zone a liquid fraction (4) enriched in acid gas components;

at least partly expanding and evaporating the liquid fraction collected at the end of stage (d) to provide, at least partially, refrigeration required during stage (b), and also to provide a mixture of expanded gaseous fraction and an acid-gas containing liquid fraction; and separating the expanded gaseous fraction(s) (10, 12) from the acid gas-rich liquid fraction and recycling the separated expanded gaseous fractions (10, 12) to stage (a).

2. Device for separation of an acid gas fraction contained in a gas mixture that comprises at least one light gas, wherein it comprises:

at least one indirect cooling means (E2) of the mixture that has a first inlet connected to a mixture feed (1) and an outlet;

an indirect heat exchanger ER that is approximately vertical and that comprises at its base a separating tank B1 that is connected to the outlet of cooling means E2, whereby said exchanger comprises means (MF) for circulating a coolant and means (MC) for circulating a hot fluid that is connected to separating tank B1;

means (8) for recovery at the top of heat exchanger ER of a gaseous fluid that has been cooled, high in light gas and low in acid gases, connected to a second inlet of indirect cooling means E2;

means (4) for recovery of a liquid fluid that is high in acid gases and low in light gas connected to the bottom of separating tank B1;

wherein means (4) for recovery of acid gas-enriched fluid comprise at least one fluid expansion means V1 connected to means for circulating the coolant in exchanger ER, whereby said means for circulating the evaporated coolant are connected to a third inlet of indirect cooling means E2 to deliver an acid gas-enriched gas; and wherein the expansion means is coupled to a first separating tank B2 that comprises an upper outlet for a gas that is enriched with lighter components than acid gases connected to a fourth inlet of indirect cooling means, and a lower outlet for an acid gas-enriched liquid, whereby said lower outlet comprises a second expansion means V3 coupled to a second separating tank B3 that comprises an upper outlet for a gas that is enriched with lighter components that acid gases connected to a fifth inlet of the indirect cooling means, whereby said indirect cooling means has a fourth outlet and a fifth outlet for gas that is enriched with lighter components than acid gases corresponding to the fourth and fifth inlets connected to gas mixture feed (1) via a compressor (K1); whereby said second separating tank (B3) has a lower outlet connected to means (MF) for circulating the coolant in exchanger ER.

3. Device according to claim 2, wherein the indirect heat exchanger is a plate exchanger.

4. Device for separation of an acid gas fraction contained in a gas mixture that comprises at least one light gas, wherein it comprises:

at least one indirect cooling means (E2) of the mixture that has a first inlet connected to a mixture feed (1) and an outlet;

an indirect heat exchanger ER that is approximately vertical and that comprises at its base a separating tank B1 that is connected to the outlet of cooling means E2, whereby said exchanger comprises means (MF) for circulating a coolant and means (MC) for circulating a hot fluid that is connected to separating tank B1;

means (8) for recovery at the top of heat exchanger ER of a gaseous fluid that has been cooled, high in light gas and low in acid gases, connected to a second inlet of indirect cooling means E2;

means (4) for recovery of a liquid fluid that is high in acid gases and low in light gas connected to the bottom of separating tank B1;

wherein means (4) for recovery of acid gas-enriched fluid comprise at least one fluid expansion means V1 connected to means for circulating the coolant in exchanger ER, whereby said means for circulating the evaporated coolant are connected to a third inlet of indirect cooling means E2 to deliver an acid gas-enriched gas; and wherein the means for recovery of the acid gas-enriched fluid comprise the expansion means coupled to a column C1 that comprises packing elements, whereby the column has an upper outlet for a gas that is enriched with component(s) lighter than the acid gas connected to the gas mixture feed via indirect cooling means E2 and a compressor K1, and a lower outlet 5a for an acid gas-concentrated liquid, whereby a second expansion means V3 is connected to the lower outlet for the liquid and to means (MF) for circulating the coolant in the upper part of exchanger ER at a temperature T2, whereby said exchanger comprises in its lower part another means (15, 16) for circulating coolant at a temperature T1>T2, connected to lower outlet (5a) of the liquid and to the lower part of said column C1.

5. Device for separation of an acid gas fraction contained in a gas mixture that comprises at least one light gas, wherein it comprises:

at least one indirect cooling means (E2) of the mixture that has a first inlet connected to a mixture feed (1) and an outlet;

an indirect heat exchanger ER that is approximately vertical and that comprises at its base a separating tank B1 that is connected to the outlet of cooling means E2, whereby said exchanger comprises means (MF) for circulating a coolant and means (MC) for circulating a hot fluid that is connected to separating tank B1;

means (8) for recovery at the top of heat exchanger ER of a gaseous fluid that has been cooled, high in light gas and low in acid gases, connected to a second inlet of indirect cooling means E2;

means (4) for recovery of a liquid fluid that is high in acid gases and low in light gas connected to the bottom of separating tank B1; and wherein means (8) for recovery of the light gas-enriched gaseous fluid comprise an expansion turbine TD of gaseous fluid connected to means (MF) for circulating coolant in the exchanger, whereby said refrigeration means are connected to the second inlet of cooling means E2, said means (8) for circulating light gas-enriched hot fluid that comprise an inlet for a solvent (20) into exchanger ER, means for recovery of acid gas-enriched liquid fluid comprising an expansion means V2 coupled to a contact column (C1), whereby said column has an upper outlet for acid gas-enriched gas that passes through cooling means E2 of the mixture, and a lower outlet (21) for acid gas- and solvent-enriched liquid connected to cooling means (E2) then to a separating tank B2, whereby said separating tank has an upper outlet for acid gas connected to the lower part of contact column C1, and a lower outlet for liquid containing the solvent connected to the top of the exchanger with means (MC) for circulating hot fluid via a pump P1.

6. A process according to claim 1, wherein the gaseous fraction depleted in acid gases collected during stage (c) comprises at least one light gas selected from the group consisting of methane, nitrogen and hydrogen.

7. A process for separating a fraction of acid gases comprising at least one of carbon dioxide and hydrogen sulfide from a gaseous mixture comprising at least one gas lighter than said acid gases, said process comprising the following stages:

(a) precooling said gaseous mixture (1) at least once;

(b) passing resultant precooled gaseous mixture obtained from stage (a) upwardly into an approximately vertical heat exchange zone (ER) wherein said gaseous mixture is indirectly heat exchanged to provide a downward liquid reflux, thereby contacting and rectifying the upwardly moving precooled gaseous mixture;

(c) collecting at the top of the vertical exchange zone, a gaseous fraction (8) depleted in acid gases and enriched in light gas;

(d) collecting at the bottom of the exchange zone a liquid fraction (4) enriched in acid gas components; and expanding the acid gas-enriched liquid fraction collected at the end of stage (d) to at least two accessive pressure levels, and contacting a liquid fraction obtained at the end of a first expansion stage countercurrently in contact zone (C1) with a vapor (16) obtained from evaporation of a portion of liquid fraction (5a) collected at the bottom of said contact zone (C1).

8. A process for separating a fraction of acid gases comprising at least one of carbon dioxide and hydrogen sulfide from a gaseous mixture comprising at least one gas lighter than said acid gases, said process comprising the following stages:

(a) precooling said gaseous mixture (1) at least once;

(b) passing resultant precooled gaseous mixture obtained from stage (a) upwardly into an approximately vertical heat exchange zone (ER) wherein said gaseous mixture is indirectly heat exchanged to provide a downward liquid reflux, thereby contacting and rectifying the upwardly moving precooled gaseous mixture;

(c) collecting at the top of the vertical exchange zone, a gaseous fraction (8) depleted in acid gases and enriched in light gas;

(d) collecting at the bottom of the exchange zone a liquid fraction (4) enriched in acid gas components; and passing a liquid stream comprising a solvent, optionally cooled, to the top of the vertical exchange zone (ER) in which stage (b) is carried out and collecting, at the bottom of said exchange zone (ER), acid gas-enriched liquid fraction (4) and at least a portion of said solvent.

9. A process for separating a fraction of acid gases comprising at least one of carbon dioxide and hydrogen sulfide from a gaseous mixture comprising at least one gas lighter than said acid gases, said process comprising the following stages:

(a) precooling said gaseous mixture (1) at least once;

(b) passing resultant precooled gaseous mixture obtained from stage (a) upwardly into an approximately vertical heat exchange zone (ER) wherein said gaseous mixture is indirectly heat exchanged to provide a downward liquid reflux, thereby contacting and rectifying the upwardly moving precooled gaseous mixture;

(c) collecting at the top of the vertical exchange zone, a gaseous fraction (8) depleted in acid gases and enriched in light gas;

(d) collecting at the bottom of the exchange zone a liquid fraction (4) enriched in acid gas components;

passing a liquid stream comprising a solvent, optionally cooled, to the top of the vertical exchange zone (ER) in which stage (b) is carried out and collecting, at the bottom of said exchange zone (ER), acid gas-enriched liquid fraction (4) and at least a portion of said solvent; and wherein the acid gas-enriched liquid fraction collected at the bottom of the exchange zone is at least partially expanded, separated and reheated in exchange zone (E2) in which stage (a) is carried out, so as to provide an acid gas-enriched gaseous fraction (23) and a liquid fraction (20) and wherein said liquid fraction is recycled in stage (b).

10. A process according to claim 1, wherein stage (b) is carried out at a pressure of between 10 and 70 bar.

11. A process according to claim 8, wherein refrigeration required during stage (b) is provided at least in part by expansion (TD) of gaseous fraction (8) collected during stage (c) depleted in acid gases and enriched in light gas.

12. A process for separating a fraction of acid gases comprising at least one of carbon dioxide and hydrogen sulfide from a gaseous mixture comprising at least one gas lighter than said acid gases, said process comprising the following stages:

(a) precooling said gaseous mixture (1) at least once;

(b) passing results precooled gaseous mixture obtained from stage (a) upwardly into an approximately vertical heat exchange zone (ER) wherein said gaseous mixture is indirectly heat exchanged to provide a downward liquid reflux, thereby contacting and rectifying the upwardly moving precooled gaseous mixture;

(c) collecting at the top of the vertical exchange zone, a gaseous fraction (8) depleted in acid gases and enriched in light gas;

(d) collecting at the bottom of the exchange zone a liquid fraction (4) enriched in acid gas components; and wherein the gaseous mixture to be separated contains water, and conducting stage (b) in the presence of methanol and separating the water from methanol by contacting the water-containing solvent phase with at least one fraction of feedstock gas.

13. A process according to claim 1, further comprising pumping at least a portion of the acid gas-enriched liquid fraction into at least one injection well underground.

14. A process according to claim 1, wherein refrigeration required during stage (b) is provided by an external source of refrigeration.

* * * * *

UNITED STATES PATENT AND TRADEMARK OFFICE
CERTIFICATE OF CORRECTION

PATENT NO. : 6,442,969 B1
DATED : September 3, 2002
INVENTOR(S) : Alexandre Rojey It is certified that error appears in the above-identified patent and that said Letters Patent is hereby corrected as shown below:

Title page,
Item [75], Inventors, reads "Lyons" should read -- Lyon --

Column 12,
Line 53, reads "passing results" should read -- passing resultant --

Signed and Sealed this

Third Day of May, 2005

JON W. DUDAS
*Director of the United States Patent and Trademark Office*